United States Patent
Sato et al.

(10) Patent No.: US 6,602,940 B1
(45) Date of Patent: *Aug. 5, 2003

(54) PROCESS FOR THE PREPARATION OF AQUEOUS SOLUTION OR DISPERSION CONTAINING CATIONIC POLYMER

(75) Inventors: Shin-ichi Sato, Kitakyusyu (JP); Takahiro Oshida, Kitakyusyu (JP); Takashi Ono, Kitakyusyu (JP); Kiyoji Kuma, Kitakyusyu (JP); Yasuharu Mori, Yokohama (JP); Atsuo Takeuchi, Yokohama (JP)

(73) Assignee: Mitsubishi Chemical Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/076,370

(22) Filed: May 11, 1998

Related U.S. Application Data

(63) Continuation of application No. 08/764,981, filed on Dec. 13, 1996, now Pat. No. 5,962,570.

(30) Foreign Application Priority Data

Dec. 15, 1995 (JP) ............................................. 7-327073
Mar. 5, 1996 (JP) ............................................. 8-47762

(51) Int. Cl.$^7$ ................................................. C08K 5/06
(52) U.S. Cl. ..................... 524/377; 524/388; 524/457; 524/502; 524/761; 524/762
(58) Field of Search ................................. 524/388, 457, 524/502, 377, 761, 762

(56) References Cited

U.S. PATENT DOCUMENTS

| | | | |
|---|---|---|---|
| 3,880,792 A | * 4/1975 | Faessinger ............. | 260/29.2 N |
| 4,421,602 A | 12/1983 | Brunnmueller et al. .. | 162/168.2 |
| 4,824,913 A | 4/1989 | Murao et al. ................ | 525/344 |
| 4,918,135 A | 4/1990 | Probst et al. ................ | 524/714 |
| 4,933,378 A | 6/1990 | Kucera et al. .............. | 523/130 |
| 4,957,977 A | 9/1990 | Itagaki et al. ................ | 525/328 |
| 5,008,321 A | 4/1991 | Hartmann et al. ........... | 524/378 |
| 5,092,935 A | 3/1992 | Crema et al. ................ | 106/808 |
| 5,270,379 A | 12/1993 | McAndrew et al. ......... | 524/555 |
| 5,281,340 A | 1/1994 | Sato et al. ................... | 210/734 |
| 5,320,712 A | * 6/1994 | Sawayama et al. ....... | 162/168.2 |
| 5,338,815 A | 8/1994 | Aizawa et al. .............. | 526/307 |
| 5,387,641 A | 2/1995 | Yeung et al. ................ | 524/557 |
| 5,399,616 A | 3/1995 | Kuhn et al. .................. | 524/765 |
| 5,455,042 A | * 10/1995 | Sakai et al. .................. | 424/443 |
| 5,571,860 A | 11/1996 | Kukkala et al. ............. | 524/503 |
| 5,686,024 A | * 11/1997 | Dahanayake et al. ....... | 252/356 |

FOREIGN PATENT DOCUMENTS

| | | |
|---|---|---|
| JP | 1-163208 | 6/1989 |
| JP | 3-195703 | 8/1991 |
| JP | 6-329718 | 11/1994 |
| JP | 61-190508 | 8/1996 |

OTHER PUBLICATIONS

WPI Abstract Accession No. 96–515025 & JP 080269111A (HAIMO) Oct. 15, 1996 (Abstract).
WPI Abstract Accession No. 81–68582D & JP 560095509A (NICHIREKI) Aug. 6, 1981 (Abstract).

* cited by examiner

Primary Examiner—Judy M. Reddick
(74) Attorney, Agent, or Firm—George W. Neuner; Edwards & Angell, LLP

(57) ABSTRACT

A process for the preparation of an aqueous solution or dispersion containing a cationic polymer, which comprises the steps of: polymerizing a monomer including an N-vinylcarboxylic acid amide represented by the general formula $CH_2$=CHNHCOR, wherein R represents a hydrogen atom or methyl group, in an aqueous medium in the presence of either or both of a polyethylene glycol and polypropylene glycol; and then modifying the resulting polymer with an acid or base. Furthermore, an aqueous composition containing a cationic polymer, which comprises (A) a modified N-vinylcarboxylic acid amide polymer, (B) either or both of a polyethylene glycol and polypropylene glycol, and (C) water is disclosed.

5 Claims, No Drawings

PROCESS FOR THE PREPARATION OF AQUEOUS SOLUTION OR DISPERSION CONTAINING CATIONIC POLYMER

This Application is a continuation of U.S. Ser. No. 08/764,981 filed on Dec. 13, 1996 and now U.S. Pat. No. 5,962,570.

FIELD OF THE INVENTION

The present invention relates to a process for the preparation of an aqueous solution or dispersion containing a cationic polymer. More particularly, the present invention relates to an aqueous solution or dispersion containing a cationic polymer having a vinylamine unit obtained by the modification of an N-vinylcarboxylic acid amide polymer.

BACKGROUND OF THE INVENTION

Heretofore, cationic polymers used as flocculants or paper chemicals are generally high molecular and water-soluble. Aqueous solutions of these cationic polymers exhibit a high viscosity even when they have a concentration as low as several percent and thus cannot be always handled easily during preparation, transportation and use. Therefore, various proposals have heretofore been made for the preparation process of cationic polymers and the form of these products. Among these proposals for the preparation process, the aqueous solution polymerization process is most commonly used as polymerization process. In this polymerization process, when the monomer concentration is raised to a value as high as scores of percent by weight for enhancing the production efficiency in an industrial mass production, the polymerization reaction solution exhibits an extremely high viscosity that causes gelation and thus can be hardly handled. In other polymerization processes such as suspension polymerization and emulsion polymerization, the handling and transportation of the resulting polymer solution are relatively easy. However, since these polymerization processes are effected with using a large amount of an organic solvent, the installation of a solvent recovery facility and the measure against dangers such as ignition add to the cost. Accordingly, it is considered most ideal to effect polymerization in an aqueous system in such a manner that the polymer solution can be easily handled from the whole standpoints of view.

Referring to the form of the product thus obtained, the product, if used as a flocculent for example, is often supplied in the form of a powder, which is dissolved in water before use. However, the powder form is disadvantageous in that it takes a lot of time to dissolve. In particular, it may involve the formation of coagulated portion, slightly soluble bulk material which makes fish-eye. This trouble may require a special dissolution facility. For example, it is required that the powder be added to water little by little through a feeder or the like. Besides the powder form, a W/O type emulsion has been recently put on the market. This type of a product normally has a low solution viscosity and thus can be easily handled. Further, this type of a product can be easily dissolved in water when used. However, an oil component such as high boiling hydrocarbon is generally used to disperse the emulsion and thus must be separated from water upon dissolution before use.

On the other hand, the above described polyvinylamine exerts an excellent effect in the application of cationic polymer as flocculant for waste water disposal, paper strength increasing agent, freeness improver or filler yield improver, and thus is expected to have a bright future. As a process for the preparation of such a polyvinylamine there has been known a process which comprises polymerizing an N-vinylformamide to obtain a poly-N-vinylformamide, and then modifying the poly-N-vinylformamide thus obtained under acidic or basic conditions so that the formyl group in the polymer is at least partially hydrolyzed, as described in JP-B-63-9523 (The term "JP-B" as used herein means an "examined Japanese patent publication"). Further, in order to further improve the various physical properties of the vinylamine, many copolymer polyvinylamines have been proposed, which are obtained by a process which comprises copolymerizing vinyl acetate, acrylonitrile, acrylic acid ester, etc. as a hydrophobic monomer with an N-vinylformamide or N-vinylacetamide as an N-vinylcarboxylic acid amide, and then modifying the copolymer thus obtained so that the formyl group or acetyl group is at least partially hydrolyzed, as described in JP-A-59-39399 (The term "JP-A" as used herein means an "unexamined published Japanese patent application") JP-A-62-74902, JP-A-63-304, JP-A-63-10609 and JP-A-3-118804.

The above described polyvinylamines have been studied of their practical application in relatively recent years. These polyvinylamines exhibit a high dehydrating ability as compared with conventional cationic polymers having a quaternary ammonium group. Thus, these polyvinylamines are excellent in many respects as flocculant. However, there are no sufficient knowledge of its preparation process. Products other than those of powder type have almost never been reported.

The above described problems in the conventional process for the preparation of cationic water-soluble polymer and the product thus obtained arise also with respect to polyvinylamine. Thus, an efficient process for the preparation of polyvinylamine and a product which can be more easily handled as a flocculant or the like have been desired. Among N-vinylcarboxylic acid amide polymers are many polymers which are precipitated when obtained by polymerization in an aqueous medium and recovered as precipitates depending on the kinds and molecular weights of copolymerizing monomers. Such a water-insoluble polymer can hardly be kept in a stably dispersed state in the aqueous medium. Further, the polymer thus precipitated tends to be agglomerated. If this agglomeration is remarkable, the polymer solution can be insufficiently stirred, to thereby adversely affect the polymerization reaction. Further, the hydrolyzation reaction at the subsequent modification step cannot smoothly proceed. Moreover, polyvinylamines having satisfactory properties cannot be obtained.

SUMMARY OF THE INVENTION

Objects and effects of the present invention will be apparent from the description of the present specification.

The inventors made extensive studies on method for inhibiting the agglomeration of a polymer produced in a process which comprises polymerizing monomers including an N-vinylcarboxylic acid in an aqueous medium, and then modifying the resulting polymer to obtain a cationic polymer and, for improving the handleability of the polymer thus modified. As a result, it was found that the polymerization and modification in the presence of a specific compound makes it possible to inhibit remarkable agglomeration of polymer. It was also found that this process makes it possible to obtain an aqueous solution or dispersion containing polyvinylamine which can be instantly used in various applications such as flocculant. Thus, the present invention has been achieved.

The present invention relates to a process for the preparation of an aqueous solution or dispersion containing a cationic polymer, which comprises the steps of:

polymerizing a monomer including an N-vinylcarboxylic acid amide represented by the general formula $CH_2=CHNHCOR$, wherein R represents a hydrogen atom or methyl group, in an aqueous medium in the presence of either or both of a polyethylene glycol and polypropylene glycol; and then modifying the resulting polymer with an acid or base.

Furthermore, the present invention also relates to an aqueous solution or dispersion containing a cationic polymer, which comprises (A) a modified N-vinylcarboxylic acid amide polymer, (B) either or both of a polyethylene glycol and polypropylene glycol, and (C) water.

DETAILED DESCRIPTION OF THE INVENTION

The present invention is described in detail below. Examples of the N-vinylcarboxylic acid amide represented by the general formula $CH_2=CHNHCOR$ (in which R represents a hydrogen atom or methyl group) include N-vinylformamide and N-vinylacetamide. In order to obtain a modification product of N-vinylcarboxylic acid amide polymer, N-vinylformamide is preferred because the resulting polymer has a good hydrolyzability.

The polymerizable monomer for use in process of the present invention may be the above described N-vinylcarboxylic acid amide alone. Alternatively, a vinyl compound other than N-vinylcarboxylic acid amide may be used in combination as a copolymerizable monomer taking into account the ease of improvement in the properties of the final product or the preference to precipitation of polymer in the polymer solution to provide for better handleability.

Examples of the vinyl compound include acrylamide, methacrylamide, acrylonitrile, methacrylonitrile, vinyl acetate, vinyl propionate, styrene, ethylene, propylene, N-vinylpyrrolidone, alkylvinyl ethers having a $C_{1-4}$ alkyl group (such as methylvinyl ether, ethylvinyl ether, isopropylvinyl ether, n-propylvinyl ether, t-butylvinyl ether), N-substituted alkyl(meth)acrylamides substituted by a $C_{1-4}$ alkyl group (such as N-methylacrylamide, N-isopropylamide and N,N-dimethylacrylamide), and (meth)acrylic acid esters having a $C_{1-20}$ ester group (such as methyl acrylate, ethyl methacrylate, propyl acrylate, butyl acrylate, hydroxyethyl acrylate, hydroxyethyl methacrylate, hydroxypropyl acrylate, hydroxypropyl methacrylate, hydroxybutyl acrylate, hydroxybutyl methacrylate, 2-methylbutyl acrylate, 3-methylbutyl acrylate, 3-pentyl acrylate, neopentyl acrylate, 2-methylpentyl acrylate, hexyl acrylate, cyclohexyl acrylate, 2-ethylhexyl acrylate, phenyl acrylate, heptyl acrylate, benzyl acrylate, tollyl acrylate, octyl acrylate, 2-octyl acrylate, nonyl acrylate and octyl methacrylate).

If the N-vinylcarboxylic acid amide (A) is copolymerized with the above described vinyl compound (B), the copolymerization molar ratio of (A) to (B) is not particularly limited. The optimum range of this copolymerization molar ratio may vary with the kind of the vinyl compound (B). If the copolymer thus produced is water-insoluble so that precipitation polymerization occurs, this copolymerization molar ratio is generally from 95:5 to 10:90, preferably from 60:40 to 40:60.

In the present invention, monomers including the above described N-vinylcarboxylic acid amide are polymerized in an aqueous medium. In this polymerization process, these monomers are polymerized in the form of aqueous solution. The resulting polymer is water-soluble or water-insoluble. For example, a mixture of monomers may be polymerized in an aqueous medium with vigorous stirring in the presence of a radical polymerization initiator. The polymerization is effected when the total monomer concentration in the Be polymerization solution is generally from 5 to 50% by weight, preferably from 10 to 40% by weight. The polymerization is preferably carried out by continuously introducing these monomer components separately or in admixture into water in such a manner that a predetermined ratio of the monomers can be obtained to cause successive polymerization.

Any ordinary radical polymerization initiators which are used for polymerization of water-soluble or hydrophilic monomers may be used as the radical polymerization initiator. However, an azo compound is preferably used to obtain a desired polymer in a high yield. In particular, a water-soluble azo compound is preferred. Examples of the water-soluble azo compound include hydrochloride salts, sulfates and acetates of 2,2'-azobis-2-amidinopropane and azobis-N,N'-dimethyleneisobutylamidine, and alkaline metal salts and ammonium salts of 4,4'-azobis-4-cyanovaleric acid. These radical polymerization initiators are generally used in an amount of from 0.01 to 5% by weight based on the weight of the monomers to be used as starting materials.

The polymerization reaction is generally effected in a stream of inert gas at a temperature of from 30° C. to 100° C., preferably from 50° C. to 80° C. The polymerization time is generally from 0.5 to 10 hours, preferably from 1 to 8 hours. The polymerization reaction involves the generation of polymerization heat. Accordingly, the polymerization system is generally cooled so that the polymerization temperature is adjusted to the above defined range.

In the present invention, it is an essential requirement that a polyethylene glycol and/or polypropylene glycol (hereinafter occasionally referred to as "polyethylene glycol or the like") be present during the above described polymerization reaction. In other words, the action of polyethylene glycol or the like makes it possible to inhibit remarkable agglomeration of the polymer and hence improve the industrial handleability of the polymer at the polymerization step and hydrolysis step. The addition of polyethylene glycol or the like little impairs the polymerization. The addition of polyethylene glycol or the like causes the precipitation of the polymer and thus can render the polymer dispersed stably in the aqueous medium, to exert an effect of improving the industrial handleability of the polymer at the polymerization step and modification step. Preferably, the polyethylene glycol or the like desirably stays solid and water-soluble. The weight-average molecular weight of the polyethylene glycol or the like is generally from 1,000 to 1,000,000, preferably from 6,000 to 100,000. The polyethylene glycol or the like may be in the form of copolymer. Copolymers of ethylene glycol with propylene glycol are suitably used in the present invention as the copolymer type of polyethylene glycol or the like. In the case of the copolymer, the polymerization molar ratio of ethylene oxide to propylene oxide is generally from 90:10 to 40:60.

The amount of the above described polyethylene glycol or the like to be added is generally from 1 to 150% by weight, preferably from 5 to 100% by weight, based on the total weight of the monomers used. If the amount of the polyethylene glycol or the like to be used is too small, the agglomeration of the copolymer cannot be sufficiently inhibited. On the contrary, if the amount of the polyethylene glycol or the like to be used is too great, the resulting effect remains much the same. This is uneconomical. The addition of the polyethylene glycol or the like is generally carried out by adding it to the aqueous medium prior to the polymerization of the monomers in the form of aqueous solution. The resulting polymer may be either water-soluble or water-insoluble. Since the effect of the polyethylene glycol or the like causes the precipitation of a hydrous gel polymer, the polymerization reaction is preferably effected with stirring from the first. In this manner, even the resulting precipitated water-insoluble polymer can be kept stably dispersed in water, making it possible to improve the industrial handleability of the polymer at the polymerization step and modification step.

In order to enhance the precipitability of the polymer, various inorganic salts may be used together with the above described components. Since a divalent or higher acid tends to ionically crosslink a polymer to render it insoluble, an inorganic salt made of a monovalent acid is preferably used in general case. Preferred examples thereof include sodium chloride, sodium nitrate, ammonium chloride, ammonium nitrate, potassium chloride, potassium nitrate, lithium chloride and lithium chloride.

The N-vinylcarboxylic acid amide polymer obtained according to the above described process is modified with an acid or base as it is in the form of solution or dispersion or after diluted with water or an alcohol so that it is converted to a water-soluble polyvinylamine. In some detail, the N-vinylcarboxylic acid amide polymer is modified at the second amide moiety of the N-vinylcarboxylic acid amide unit. As a result of the modification reaction involving hydrolysis, a vinylamine unit is produced as a repeating unit. In the case where a copolymer is produced, the structure of the vinyl compound used may be partially modified. For example, a nitrile group is hydrolyzed to an amide group and carboxyl group. These groups may further react with a primary amino group of vinylamine unit produced by the hydrolyzation of the above described secondary amide to form an amidine ring or lactam ring.

The modifier for use in the acid modification may be any compound which acts as a strong acid. Examples thereof include hydrochloric acid, bromic acid, hydrofluoric acid, sulfuric acid, nitric acid, phosphoric acid, sulfamic acid, and alkaneslfonic acid. Particularly preferred among these acids is hydrochloric acid. Sulfuric acid or the like can cause hydrolyzation. However, sulfuric acid tends to insolubilize the polymer when used in a large amount. Therefore, the use of sulfuric acid alone is not so desirable.

The modifier for use in the base modification may be any compound which acts as a strong base. Examples thereof include sodium hydroxide, potassium hydroxide and quaternary ammonium hydroxide. The modification of the polymer may be effected with either an acid or a base. When an N-vinylcarboxylic acid amide homopolymer is modified with a base, it may undergo gelation. In general, the polymer is preferably modified with an acid.

The modified percentage of N-vinylcarboxylic acid amide polymer is defined as the hydrolyzation percentage of formyl group or acetyl group in the polymer. The modified percentage may be properly selected depending on the properties of the intended polymer. If the modified percentage is too low, the resulting polymer can be hardly rendered water-soluble. Further, since the resulting cation content is too low to exert a sufficient effect as a flocculent, the modified percentage is generally from 5 to 100 mol %, preferably from 20 to 95 mol %. In other words, a vinylamine unit is incorporated as a repeating unit of modified polymer generally in an amount of from 5 to 100 mol %, preferably from 20 to 95 mol %. The amount of the modifier to be used may be properly selected within a range of from 0.1 to 3 mol per mol of formyl group or acetyl group in the polymer depending on the desired modified percentage. The temperature at which the modification reaction effects is generally from 40° C. to 130° C., preferably from 60° C. to 100° C., when an N-vinylformamide polymer is produced. When an N-vinylacetamide polymer is produced, the temperature is generally from 50° C. to 150° C., preferably from 90° C. to 130° C. The modification reaction may be effected in a pressure reaction system as necessary. The modification reaction time depends on the modification temperature and the desired modified percentage, but is generally from 0.5 to 10 hours.

If the viscosity of the polymer solution is high, that is, the concentration of the modified N-vinylcarboxylic acid amide polymer is such that the reduced viscosity thereof at 25° C. in a solution prepared by dissolving it in a 1-N sodium chloride aqueous solution to the concentration of 0.1 g/dl is generally from 3 to 10 dl/g, the modification reaction can be effectively carried out by adding an alcohol to a polymerizing solution containing an N-vinylcarboxylic acid amide polymer. Of course, the modification reaction can be effected free from alcohol. However, if the modification reaction is effected free from alcohol, the dispersed particles of polymer tend to agglomerate, making it difficult to maintain the polymer in the form of slurry. The addition of an alcohol exerts an effect of keeping the polymer slurry during the modification reaction. This is probably because the alcohol thus added becomes a poor solvent for the polymer which helps the precipitation of the polymer and hence inhibit the agglomeration thereof. The alcohol which may be used herein is a $C_{1-4}$ alcohol. Further, the alcohol is a water-soluble alcohol such as methanol, ethanol, isopropanol, ethylene glycol and 1,4-butanediol. The optimum amount of the alcohol to be added greatly varies with the composition of the polymer, the concentration of the polymerization solution, etc., but is generally from 0.05 to 5 times, preferably from 0.1 to 3 times the weight of the polymer.

If an alcohol is added during the modification reaction, the alcohol may be volatilized away from the system when the system is heated during the modification reaction. Further, formic acid or acetic acid produced by the modification reaction may undergo esterification with the alcohol so that the alcohol can be efficiently removed from the system.

The reaction solution (aqueous solution or dispersion) which has undergone the above described modification reaction can be used as a product such as flocculant or paper chemical as it is in the form of aqueous solution containing a modified N-vinylcarboxylic acid amide polymer having desired properties, i.e., cationic polymer having a vinylamine unit. The reaction solution containing a cationic polymer comprises, as main components, three components: (A) a modified N-vinylcarboxylic acid amide polymer, (B) a polyethylene glycol or the like and (C) water. The sum of the weight of the three components generally accounts for not less than 60% by weight, preferably not less than 80% by weight, of the total weight of the reaction solution. The various additives used at the polymerization step and modification step may be left as contained in the reaction solution. The alcohol added during the modification reaction is generally evaporated away for reuse but may be left in the reaction solution, which does not cause any particular trouble.

The proportion of the three main components of the reaction solution is generally as follows. The contents of the modified N-vinylcarboxylic acid amide polymer (A), the polyethylene glycol or the like (B) and water (C) are from 5 to 45% by weight, from 0.05 to 60% by weight, and from 5 to 94.95% by weight, respectively, based on the total weight of the three components (A), (B) and (C). The modified N-vinylcarboxylic acid amide polymer (A) generally has a reduced viscosity of from 0.1 to 10 dl/g as determined at 25° C. in a solution prepared by dissolving it in a 1-N sodium chloride aqueous solution to the concentration of 0.1 g/dl. The modified polymer thus obtained stays as dissolved in the reaction solution, or is kept as stably dispersed in the reaction solution. The state of the modified polymer in the reaction solution, i.e., whether it is kept as dissolved or dispersed in the aqueous solution, greatly depends on the molecular weight of the modified polymer, the composition of the aqueous solution, etc.

If the modified polymer is present as dissolved in the reaction solution, the contents of the modified N-vinylcarboxylic acid amide polymer (A), the polyethylene glycol or the like (B) and water (C) are preferably from 5 to 45% by weight, from 0.05 to 18% by weight, and from 35 to 94.95% by weight, respectively, based on the sum of the weight of the components (A), (B) and (C). Particularly preferred contents of the components (A), (B) and (C) are from 10 to 40% by weight, from 1 to 15% by weight, and from 45 to 85% by weight, respectively, based on the sum of the weight of the components (A), (B) and (C). In addition, the reduced viscosity of the modified polymer is preferably from 0.1 to 2 dl/g as determined under the above defined condition.

If the modified polymer is present as dispersed in the reaction solution, the contents of the modified N-vinylcarboxylic acid amide polymer (A), the polyethylene glycol or the like (B) and water (C) are preferably from 5 to 45% by weight, from 0.05 to 60% by weight, and from 5 to 94.95% by weight, respectively, based on the sum of the weight of the components (A), (B) and (C). Particularly preferred contents of the components (A), (B) and (C) are from 10 to 40% by weight, from 2 to 40% by weight, and from 35 to 85% by weight, respectively, based on the sum of the weight of the components (A), (B) and (C). In addition, the reduced viscosity of the modified polymer is preferably from 3 to 10 dl/g as determined under the above identified condition. In this embodiment, the modified polymer is finely dispersed in the reaction solution. However, when the aqueous dispersion is diluted with water, the concentration of auxiliaries such as polyethylene glycol which contribute to the precipitation and dispersion of the modified polymer is lowered so that the modified polymer is rapidly dissolved in water. Accordingly, the aqueous dispersion having the modified polymer dispersed therein can also be used as a product such as flocculant and paper chemical as it is.

The present invention will be described in more detail with reference to the following Examples, but the present invention should not be construed as being limited thereto.

EXAMPLE 1

In a 1 m³ reaction vessel equipped with an agitator and a temperature controller were charged 296.1 kg of distilled water and 27 kg of a polyethylene glycol (PEG, weight-average molecular weight: 20,000). A nitrogen gas was then passed through the reaction system. Subsequently, the reaction system was sealed, and then heated to a temperature of 70° C. To the reaction system was then added 2,2'-azobis (2-amidinopropane) hydrochloride as a polymerization initiator in an amount of 1.5% by weight based on the weight of the monomers. With stirring at 200 r.p.m. at the same temperature, a 60 wt %-monomer aqueous solution comprising 54.7 kg of N-vinylformamide (purity: 93.7%) and 38.7 kg of acrylonitrile (molar mixing ratio of these monomers: 50:50) dissolved therein was supplied into the reaction system over 3 hours. The reaction system further underwent polymerization for 2 hours (final monomer concentration: 18.9%) to obtain a suspension having a polymer precipitated in water. Thereafter, the temperature of the suspension was lowered to 50° C. To the suspension was then added hydroxylamine sulfate as a gelation inhibitor in an amount of 5 mol % based on the amount of N-vinylformamide. The mixture was then stirred for 1 hour. To the reaction mixture was then added concentrated hydrochloric acid in an amount of 60 mol % based on the amount of N-vinylformamide unit in the polymer (i.e., formyl group in the polymer). The reaction mixture was stirred at a temperature of 70° C. for 1 hour, and then at a temperature of 90° C. for 3 hours. The resulting polymer was then modified with an acid to obtain an aqueous solution of the modified polymer.

Thus obtained modified polymer was measured in terms of modified percentage and reduced viscosity, and the results thereof are set forth in Table 1. For the measurement of reduced viscosity, a predetermined amount of the aqueous solution of the modified polymer was sampled. The sample was diluted with a 1-N sodium chloride aqueous solution to obtain a solution in which the concentration of the modified polymer is 0.1 g/dl. Thus obtained solution was used for the measurement of reduced viscosity. The term "modified percentage" as used herein means the decomposed ratio of formyl groups in the polymer.

In the above described polymerization and modification reactions, no phenomena such as agglomeration and deposition of polymer was observed. Thus, the resulting polymer could be conveniently handled as a suspension or aqueous solution. The composition of the aqueous solution of the modified polymer is shown in Table 3.

EXAMPLE 2

The procedure of Example 1 was followed to prepare an aqueous solution of a modified polymer, except that the polymerization temperature was changed. As a result, the operating efficiency at the polymerization step and modification step was good as in Example 1. The quality of the resulting modified polymer is set forth in Table 1. The composition of the aqueous solution of the modified polymer is set forth in Table 3.

EXAMPLE 3

The procedure of Example 1 was followed to prepare an aqueous solution of a modified polymer, except that the concentration of the monomers during polymerization and the addition amounts of polyethylene glycol and hydrochloric acid were changed as shown in Table 1. As a result, the operating efficiency at the polymerization step and modification step was good as in Example 1. The quality of the resulting modified polymer is set forth in Table 1. The composition of the aqueous solution of the modified polymer is set forth in Table 3.

EXAMPLE 4

The procedure of Example 3 was followed to prepare an aqueous solution of a modified polymer, except that the addition amount of polyethylene glycol was changed as shown in Table 1. As a result, the operating efficiency at the polymerization step and modification step was good as in Example 1. The quality of the resulting modified polymer is set forth in Table 1. The composition of the aqueous solution of the modified polymer is set forth in Table 3.

COMPARATIVE EXAMPLE 1

Polymerization was effected in the same manner as in Example 1, except that the polyethylene glycol was not added. As a result, the resulting polymer caused remarkable deposition thereof on the polymerization tank, wall and agitating blade, making it impossible to keep the polymer in the form of slurry.

again. In the above described polymerization and modification reactions, no phenomena such as agglomeration and deposition of the polymer was observed. Thus, the resulting polymer could be conveniently handled as a suspension or aqueous solution.

Thus obtained modified polymer was measured in terms of reduced viscosity, cation equivalent and modified percentage, and the results obtained are set forth in Table 2. For the measurement of reduced viscosity, a predetermined amount of the aqueous solution of the modified polymer was sampled. The sample was diluted with a 1-N sodium chloride aqueous solution to obtain a solution in which the concentration of the modified polymer is 0.1 g/dl. The cation equivalent was determined by colloidal titration. The term "modified percentage" as used herein means the decompo-

TABLE 1

|  | Example 1 | Example 2 | Example 3 | Example 4 | Comparative Example 1 |
|---|---|---|---|---|---|
| Monomer concentration (wt %) | 18.9 | 18.9 | 30.0 | 30.0 | 18.9 |
| Polymerization temperature (° C.) | 70 | 60 | 70 | 70 | 70 |
| Addition amount of PEG (wt %) | 30 | 30 | 10 | 7.5 | — |
| Addition amount of hydrochloric acid (mol %) | 60 | 60 | 65 | 65 | — |
| Modified percentage (mol %) | 62 | 65 | 74 | 75 | — |
| Reduced viscosity | 0.4 | 1.0 | 0.4 | 0.4 | — |

Note 1) Addition amount of PEG (%): Weight percentage of addition amount of polyethylene glycol based on the total amount of monomers

EXAMPLE 5

In a 200 mg separable flask equipped with a reflux condenser, a paddle agitator, a nitrogen blowing pipe and a temperature controller were charged 24.3 g of an N-vinylformamide (purity: 91%), 2.97 g of methyl acrylate, 10 g of a polyethylene glycol (weight-average molecular weight: 20,000), 10 g of sodium nitrate and 53 g of water. Further, a 0.1-N aqueous solution of NaOH was added to the mixture so that the pH value thereof was adjusted to 6.5. The air in the system was then replaced by nitrogen over 30 minutes. The reaction system was heated to a temperature of 55° C. where 0.0375 g of 2,2'-amidinopropane hydrochloride was then added thereto as a polymerization initiator with stirring. The mixture was heated to a temperature of 60° C. and stirred for 4 hours, and further stirred for 1 hour at a temperature of 65° C. The resulting polymer was precipitated in the form of hydrous gel, but stirring of the reaction system could be effected. Subsequently, to the reaction system was added 2.35 g of hydroxylamine hydrochloride. The reaction system was then stirred at a temperature of 50° C. for 1 hour. To the reaction system were then added 20.9 ml of a 35% hydrochloric acid and 32.5 g of methanol. The reaction mixture was then stirred at a temperature of 60° C. for 4 hours. Subsequently, the supply of water through the reflux condenser was suspended. The reaction system was then stirred at a temperature of 90° C. while being air-cooled for 1 hour to volatilize methanol and methyl formate away. The reaction system was then allowed to cool to room temperature to terminate the reaction. Thus, a fine dispersion of the modified polymer was obtained. When the dispersion was allowed to stand as it was, the precipitation of finely divided particles was observed. However, the polymer was readily dispersed, when the polymer solution was stirred sition ratio of formyl groups in the polymer. The composition of the aqueous solution of the modified polymer is set forth in Table 3.

EXAMPLE 6

In the same 200 ml separable flask as used in Example 5 were charged 14 g of an N-vinylformamide (purity: 91%) as an only monomer, 26 g of water, 10 g of a polyethylene glycol (weight-average molecular weight: 20,000) and 0.01875 g of 2,2'-amidinopropane hydrochloride. The air in the system was then replaced by nitrogen over 30 minutes. The reaction system was heated to a temperature of 60° C. and stirred for 4 hours, and then further stirred at a temperature of 65° C. for 1 hour. As the polymerization reaction proceeded, a polymer was precipitated. Subsequently, to the reaction system were added 1.2 g of hydroxylamine hydrochloride and 12.8 g of ammonium chloride. The reaction mixture was then stirred at a temperature of 50° C. for 1 hour. To the reaction system were then added 18.4 g of a 35% hydrochloric acid and 17 g of methanol. The reaction mixture was stirred at a temperature of 60° C. for 2 hours, and then at a temperature of 65° C. for 1 hour. Subsequently, the supply of water through the reflux condenser was suspended. The reaction system was then stirred at a temperature of 75° C. while being air-cooled for 2 hours to volatilize methanol and methyl formate away. The reaction system was then allowed to cool to room temperature to terminate the reaction. Thus, a dispersion of a modified polymer was obtained. The particles in the dispersion were greater and thus were more readily precipitated than those in Example 1 when the solution was allowed to stand as it was, but were readily dispersed when the solution was stirred again. In the above described polymerization and modification reactions, no phenomena such as agglomeration and deposition of polymer was observed. Thus, the resulting polymer could be conveniently handled as a suspension or aqueous solution. The quality of the modified polymer thus obtained is set forth in Table 2. The composition of the aqueous solution of modified polymer is set forth in Table 3.

EXAMPLE 7

In a 200 ml separable flask equipped with a reflux condenser, a paddle agitator, a nitrogen blowing pipe, a temperature controller and a dropping funnel were charged 10 g of sodium nitrate, 10 g of a polyethylene glycol (weight-average molecular weight: 20,000), 38.3 g of water and 0.01875 g of 2,2'-amidinopropane hydrochloride. The air in the system was then replaced by nitrogen over 30 minutes. Separately, a mixture of 24.4 g of an N-vinylformamide (purity: 91%), 2.97 g of methyl acrylate, 0.0187 g of 2,2'-amidinopropane hydrochloride and 14.33 g of water was prepared, and the air in the mixture was replaced by nitrogen over 30 minutes. This monomer mixture was then put in the dropping funnel. The monomer mixture was then added dropwise to the reaction system in the separable flask over 2 hours while the separable flask was heated to a temperature of 60° C. The reaction system was stirred for 2 hours at a temperature of 60° C., and further stirred for 1 hour at a temperature of 65° C. The resulting polymer was precipitated in the form of hydrous gel, but stirring of the reaction system could be effected. Subsequently, to the reaction system was added 2.15 g of hydroxylamine hydrochloride. The reaction mixture was then stirred at a temperature of 50° C. for 1 hour. To the reaction system were then added 19.4 g of a 35% hydrochloric acid and 29.8 g of methanol. The reaction mixture was then stirred at a temperature of 60° C. for 4 hours. Subsequently, the supply of water through the reflux condenser was suspended. The reaction system was then stirred at a temperature of 90° C. while being air-cooled for 1 hour to volatilize methanol and methyl formate away. The reaction system was then allowed to cool to room temperature to terminate the reaction. Thus, a dispersion of a modified polymer was obtained. When the dispersion was allowed to stand as it was, the precipitation of fine particles was observed. However, the particles were readily dispersed, when the solution was stirred again. In the above described polymerization and modification reactions, no phenomena such as agglomeration and deposition of polymer was observed. Thus, the resulting polymer could be conveniently handled as a suspension or aqueous solution. The quality of the thus obtained modified polymer is set forth in Table 2. The composition of the aqueous solution of the modified polymer is set forth in Table 3.

EXAMPLE 8

The procedure of Example 7 was followed to effect polymerization, except that as the monomers used in Example 7 were replaced by 23.9 g of N-vinylformamide (purity: 91%) and 3.38 g of methyl methacrylate. As a result, a polymer mixture which exhibits a lower viscosity and thus can be more easily stirred than in Example 7 was obtained. Subsequently, to the polymer mixture was added 2.15 g of hydroxylamine hydrochloride. The reaction mixture was then stirred at a temperature of 50° C. for 1 hour. To the reaction system were then added 18.8 ml of a 35% hydrochloric acid and 29.8 g of methanol. The reaction mixture was then stirred at a temperature of 60° C. for 4 hours. Subsequently, the supply of water through the reflux condenser was suspended. The reaction system was then stirred at a temperature of 90° C. while being air-cooled for 1 hour to volatilize methanol and methyl formate away. The reaction system was then allowed to cool to room temperature to terminate the reaction. Thus, a dispersion of modified polymer was obtained. When the dispersion was allowed to stand as it was, the precipitation of fine particles was observed. However, the particles were readily dispersed, when the solution was stirred again. In the above described polymerization and modification reactions, no phenomena such as agglomeration and deposition of polymer was observed. Thus, the resulting polymer could be conveniently handled as a suspension or aqueous solution. The quality of the modified polymer thus obtained is set forth in Table 2. The composition of the aqueous solution of the modified polymer is set forth in Table 3.

EXAMPLE 9

The procedure of Example 7 was followed to effect polymerization and modification, except that the used amount of 35% hydrochloric acid was changed to 16.6 ml. The resulting polymer, modified polymer and dispersion stability were similar to that in Example 7. The quality of the modified polymer thus obtained is set forth in Table 2. The composition of the dispersion of the modified polymer is set forth in Table 3.

EXAMPLE 10

The procedure of Example 8 was followed to effect polymerization and modification, except that the polyethylene glycol having a weight-average molecular weight of 20,000 was replaced by a polyethylene glycol having a weight-average molecular weight of 6,000. As a result, as compared with Example 8, the resulting polymer was more finely divided to exhibit a tendency for better slurry condition. The resulting polymer, modified polymer and dispersion stability were similar to that in Example 8. The quality of the modified polymer thus obtained is set forth in Table 2. The composition of the dispersion of the modified polymer is set forth in Table 3.

TABLE 2

|  | Reduced viscosity (dl/g) | Cation equivalent (meq.) | Modified percentage (%) |
| --- | --- | --- | --- |
| Example 5 | 4.21 | 8.3 | 72.0 |
| Example 6 | 3.90 | 9.0 | 69.3 |
| Example 7 | 4.31 | 6.3 | 53.7 |
| Example 8 | 4.62 | 7.6 | 66.8 |
| Example 9 | 4.23 | 5.3 | 44.7 |

Comparative Example 2

The same reaction system as used in Example 5 was subjected to polymerization, except that the polyethylene glycol was omitted. As a result, an insoluble gel was produced throughout the reaction solution, making it difficult to stir and transport the product.

TABLE 3

| | Formulation of various components in aqueous solution (wt %) | | |
|---|---|---|---|
| | (A) | (B) | (C) |
| Examples 1, 2 | 17.5 (18.4) | 5.0 (5.3) | 72.5 (76.3) |
| Example 3 | 27.0 (29.3) | 2.7 (2.9) | 62.6 (67.8) |
| Example 4 | 27.0 (29.3) | 2.0 (2.2) | 63.3 (68.6) |
| Example 5 | 22.7 (25.9) | 8.4 (9.6) | 56.6 (64.5) |
| Example 6 | 17.7 (22.1) | 13.0 (16.2) | 49.5 (61.7) |
| Examples 7, 8 | 23.0 (26.3) | 8.6 (9.8) | 56.0 (63.9) |
| Example 9 | 23.3 (26.6) | 8.7 (9.9) | 55.5 (63.5) |

Note 1)
(A) Modified N-vinylcarboxylic acid amide polymer
(B) Polyethylene glycol
(C) Water
Note 2)
The figure in the parenthesis indicates the weight percent based on the sum of the weight of the components (A), (B) and (C).

As mentioned above, the use of an N-vinylcarboxylic acid amide as a monomer material makes it possible to simply and efficiently prepare an aqueous solution containing a cationic water-soluble polymer. In particular, remarkable agglomeration of polymer during the polymerization in an aqueous medium is inhibited, making it possible to keep the polymer solution easily handleable at the polymerization step and the subsequent acid modification step. The aqueous solution containing a cationic water-soluble polymer according to the present invention can be easily handled and can be used as a product such as flocculant and paper chemical as it is.

While the invention has been described in detail and with reference to specific examples thereof, it will be apparent to one skilled in the art that various changes and modifications can be made therein without departing from the spirit and scope thereof.

What is claimed is:

1. An aqueous composition containing a cationic polymer, said composition comprising (A) a N-vinylcarboxylic acid amide polymer modified with an acid or a base, (B) material selected from the group consisting of polyethylene glycol, polypropylene glycol and mixture thereof and (C) water wherein (i) the content of component (C) based on the sum of the weight of the components A), (B) and (C) is not less than 35% by weight; the content of component (B) based on the sum of the weight of the components (A), (B) and (C) is from 1 to 15% by weight; and (iii) the sum of the weight of components (A), (B) and (C) accounts for not less than 80% by weight of the total weight of the aqueous composition.

2. The aqueous composition according to claim 1, wherein the weight percentage of the components (A) and (C) are from 10 to 40% by weight and from 45 to 85% by weight, respectively, based on the sum of the weight of the components (A), (B) and (C).

3. The aqueous composition according to claim 1, wherein said modified N-vinylcarboxylic acid amide polymer has a reduced viscosity of from 0.1 to 10 dl/g at a temperature of 25° C. in a solution consisting of said polymer and a 1-N sodium chloride aqueous solution and having a concentration of said polymer of 0.1 g/dl.

4. The aqueous composition according to claim 1, wherein the weight percentage of the components (A) and (C) are from 10 to 40% by weight and from 45 to 85% by weight, respectively, based on the sum of the weight of the components (A), (B) and (C), and wherein said modified N-vinylcarboxylic acid amide polymer (A) has a reduced viscosity of from 0.1 to 2 dl/g at a temperature of 25° C. in a solution consisting of said polymer and a 1-N sodium chloride aqueous solution and having a concentration of said polymer of 0.1 g/dl.

5. The aqueous composition according to claim 1, wherein the weight percentage of the components (A) and (C) are from 10 to 40% by weight and from 35 to 85% by weight, respectively, based on the sum of the weight of the components (A), (B) and (C), and wherein said modified N-vinylcarboxylic acid amide polymer (A) has a reduced viscosity of from 3 to 10 dl/g at a temperature of 25° C. in a solution consisting of said polymer and a 1-N sodium chloride aqueous solution and having a concentration of said polymer of 0.1 g/dl.

* * * * *